KEYED HIGH FREQUENCY TRANSMITTERS

Filed June 14. 1957 2 Sheets-Sheet 1

Inventor
Paul D. Buffet
By Ralph B. Stewart
attorney

June 20, 1961 P. D. BUFFET 2,989,625

KEYED HIGH FREQUENCY TRANSMITTERS

Filed June 14, 1957 2 Sheets-Sheet 2

Inventor
Paul D. Buffet
By Ralph B. Stewart
Attorney

United States Patent Office 2,989,625
Patented June 20, 1961

2,989,625

KEYED HIGH FREQUENCY TRANSMITTERS

Paul D. Buffet, Montfermeil, Seine et Oise, France, assignor to l'Electronique Appliquee, Paris, France Filed June 14, 1957, Ser. No. 665,840
Claims priority, application France June 19, 1956
14 Claims. (Cl. 250—17)

The present invention concerns improvements in or relating to keyed signal transmitters and is specially concerned with such transmitters that are of light construction and independent battery supply, and the invention primarily relates to an improved automatic keying device therefor and subsidiarily to means associated with the said improved automatic keying device both for the activation control thereof and for the control therefrom of the transmission of at least another kind of signal than that normally keyed thereby when activated, and constituted by an identification transmitter code. According to the requirements for this other kind of signal, it may be either a further keyed and/or an amplitude-modulated signal.

According to the invention, an automatic keying arrangement for such a transmitter of the above specified kind includes a lightweight rotor asynchronous motor the axle of which drives at least one cam which controls the keying of the high frequency part of the transmitter according to a fixed identification code and a definite time program for the said keying, and a vacuum tube low frequency oscillator the plate oscillating circuit of which includes the inductor or field winding of the said motor as the inductance thereof for the drive of the said keying control motor, said inductor winding providing the sole inductive reactance for determining the frequency of the oscillator.

According to further features of the invention, on the one hand at least a further signal keying and/or modulating device is combined with the said automatic keying arrangement, and on the other hand, activation control means of the said combination are provided from a manual and/or automatic action on the vacuum tube heating current for at least the said low frequency oscillator.

Figure 1:
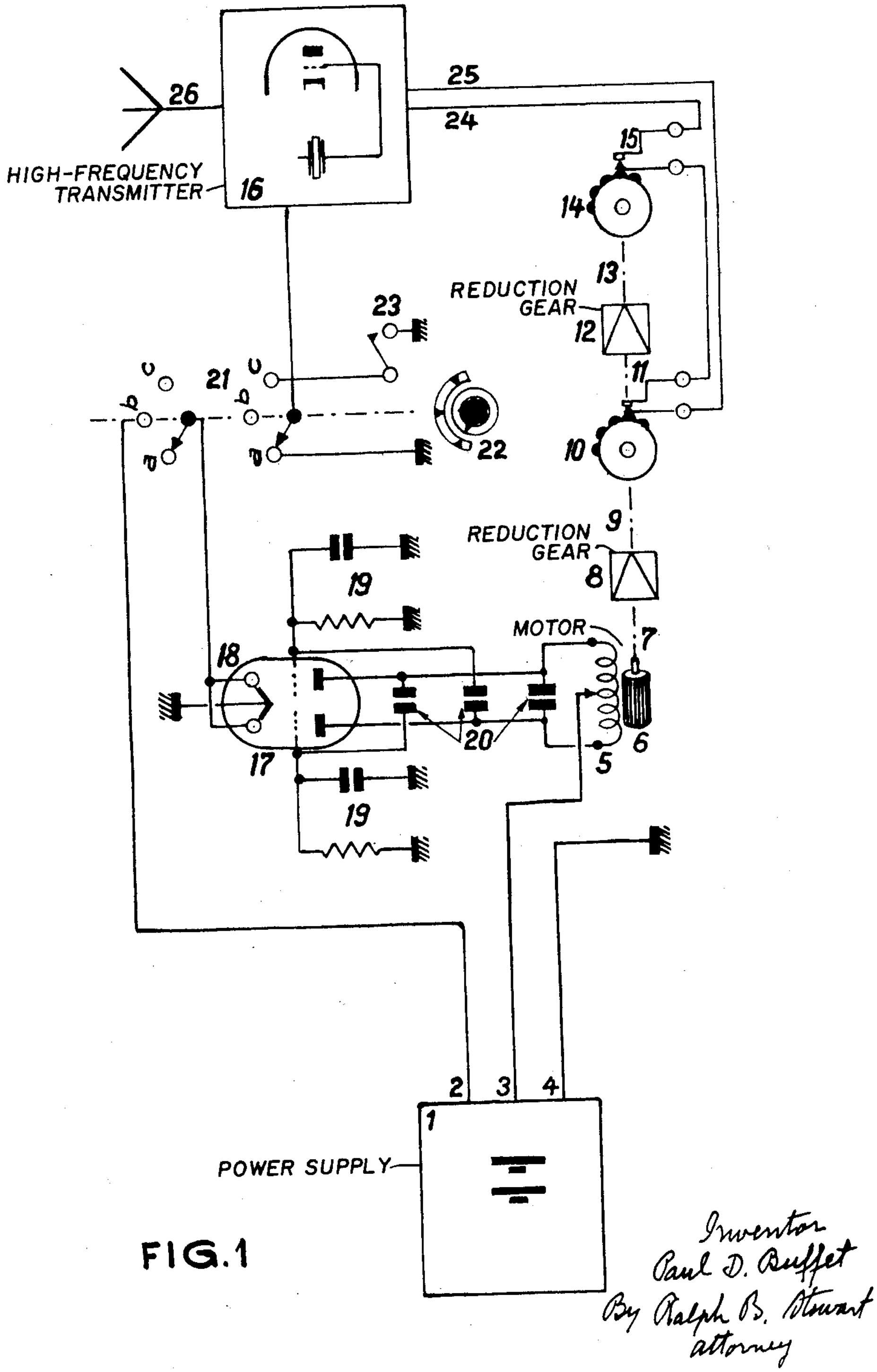
Figure 2:
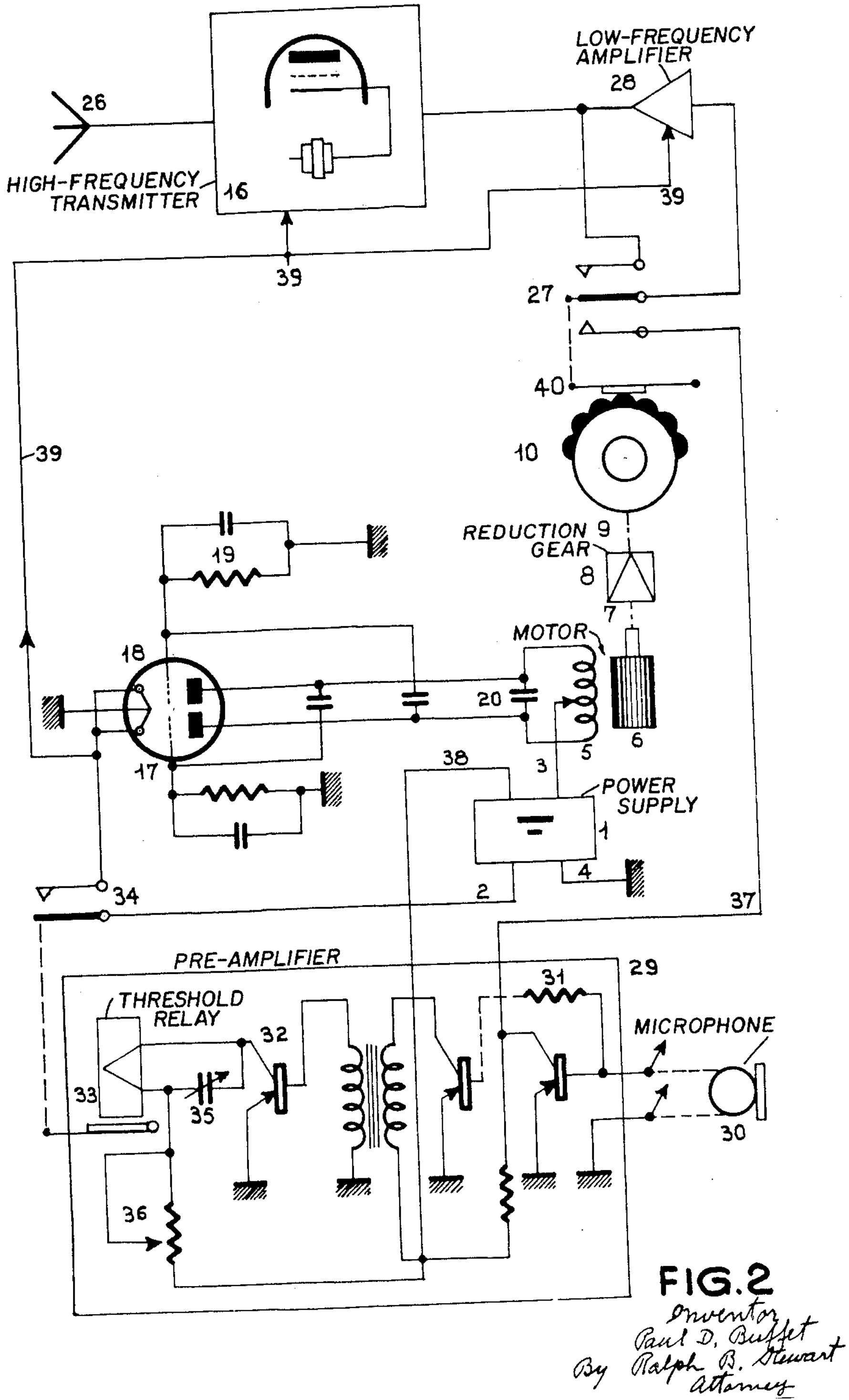

The invention will be fully disclosed with reference to the accompanying drawings which in FIGS. 1 and 2 thereof respectively show two illustrative though non limitative embodiments of the invention as it may be applied to a manually controlled (FIG. 1) or to an automatically controlled (FIG. 2) emergency transmitter.

Referring to FIG. 1, a battery box 1 is shown with an output 2 for delivering a D.C. heating current to the heater filaments of a double-triode vacuum tube 17—18 and an output 3 for delivering the high voltage D.C. supply to all tubes of the transmitter. At 4 is shown an earth reference connection for the electrical circuits of the said transmitter. The high-frequency portion of the transmitter is represented by the block 16.

The double-triode tube 17—18 is so designed in the surrounding circuitry thereof as to operate as a low frequency oscillator, of say 50 to 60 cycles per second. The self-biasing networks for the grids of the said double-triode tube are shown at 19. The plate oscillating network comprises condensers 20 and an inductance or field which is the inductor winding 5 of a small asynchronous motor the rotor 6 of which is preferably of the squirrel-cage type and of light weight material. The heater supply circuit 2 from the battery passes through one bank of a three position manually operated switch 21 which is controlled by knob 22. With the said switch on the *b* position thereof, the heaters of the vacuum tube 17—18 are fed and the automatic keying device is fully operative. With switch 21 on the *a* position thereof, the current is no longer fed to the said heaters and the automatic keying device is de-activated. The position *c* of the said switch is not essential but provides for manual keying of the transmitter separately from its automatic keying by means of the key 23.

The axle or shaft 7 of the rotor 6 drives, through a reducing gear 8, the axle of rotation 9 of a cam 10 bearing on the periphery thereof a series of protuberances or stubs which, by their distribution on a portion of the said periphery, determine both an identification code and a timing program for the effective keying of the transmitter with the identification code. Each stub of the cam 10 operates, by a purely mechanical action to close an electrical contact 11. In the arrangement of FIG. 1, further, the axle 9 also drives, through a further reducing gear 12, another axle 13 bearing a second cam 14 which, through the action of the stubs thereof, actuates a further electrical contact 15 according to a different keying code. Both contacts 11 and 15 are connected in series in wires 24 and 25 which it must be understood are connected to effect keying of a high frequency stage indicated schematically including a quartz-controlled oscillator 16, supplied from the battery 1. The transmitter antenna (in the case of a radio transmission) may be of any suitable kind for instance a flexible self-supporting antenna and is shown at 26.

When the switch 21 is set to the *a*-position thereof, the heater supply is cut off from the vacuum tube 17—18, the low frequency oscillator is blocked and the motor does not rotate. If the high frequency part of the arrangement is supplied from the battery, it is operative and radiates a continuous wave. The operativeness of the said high frequency portion of the arrangement is for instance controlled by the application thereto of an earth potential through the other bank of contacts of the switch 21 by operation of the key 23.

When the switch 21 is brought to the *b*-position thereof, by operation of the control knob shown at 22, the low frequency oscillator including the vacuum-tube 17—18 is activated and the motor 5—6 rotates, driving the cams 10 and 14. The high frequency wave in 16 is then controlled for keying through the closures and interruptions of the leads 24 and 25 produced by the action of the cams upon the serially connected electrical contacts 11 and 15. During each time interval of closure of the contact 15, each closure of the contact 11 will unblock the oscillator 16 and when the contact 15 is open, the keying of the contact 11 does not produce any further action on the said oscillator. The lead 24 may be considered as connected to earth. The keying proper is quite conventional within the high frequency part of the transmitter.

As previously mentioned, a third position is provided for the switch 21, position *c* wherein, when required, a manual keying operation may be impressed upon the high frequency part of the transmitter by manual operation of a key 23.

The cam 10 bears an identification code of the transmitter, followed as required by another code of information such as for instance an emergency code. The cam 14 ensures interruptions in the application of this keying code and program according to a further code of operation.

As an example, one may consider that during two minutes, the identification signal will be transmitted at least twenty times, then cam 14 applies an interruption of for instance 8 minutes, and so forth. Of course, there is no necessity that the configurations of the cams apply a strictly timed periodical program.

In the concerned example further, a transmission on a single wave-length is considered to be effected but of course such a transmitter may radiate on two or more distinct carrier frequencies, each of the said frequencies being controlled from a separate quartz crystal. These distinct frequencies may then either be commonly keyed from the device described or else they may be keyed according to a predetermined sequence, and such a sequence may then advantageously be provided either by the cam 14 or by at least a further cam driven by the motor of the automatic device.

Such a keying device must of course have recourse to cams of a particularly light structure as the power available from the motor is small. This will not affect the contact pressure which may be obtained at such electrical contacts as 11 and 15 as it will suffice therefor to make these contacts with a so-called micro-switch arrangement. As known in such a kind of switch, and due to a prior treatment of flexible blades, the contact pressure is independent of the magnitude of the action which controls them provided the controlling action is higher than a definite and low threshold value sufficient to initiate the changing-over of the contact. A further advantage of using this kind of contact switch is that there is practically no disturbing bounce in the operation thereof.

A light cam which for use in transmitter keying devices according to the invention consists of a molded disc of plastic material with stubs normal to the plane of the disc and primarily of a regular distribution therearound. The application of a code thereto will then be obtained by abrasion of some of these stubs. Of course good results may also be obtained with light metal discs either molded or machined to exhibit a required keying code.

By addition of or merely substitution for the manually operated switch 21 of FIG. 1 of an automatic activating arrangement for the keying device responsive to some external phenomenon, the arrangement is modified as illustrated in FIG. 2 wherein the said phenomenon is the ambient sound atmosphere at the location of the transmitter. In such a case further it will then be of advantage also to transmit the information constituted by the change of this phenomenon according to the time, and in association with the automatic identification code of the transmitter.

In FIG. 2, the battery box 1 delivers in addition to the above-mentioned voltages, a further voltage for a preamplifier 29 of the electrical signal resulting from the pick-up of the "noise" around the location of the transmitter by a microphone 30. This voltage lead is shown at 38. This preamplifier is shown as being formed of transistor stages and includes at least: an input stage 31, an intermediary stage and a final stage 32. The nature of the microphone 30 is adapted to the requirements and may be either a microphone for air noises, subterranean noises or submarine noises as the case may be. Several microphones of distinct locations may be used for a single transmitter and, if needed, each of the said microphones may be provided with a separate preamplifier or else several microphones may be branched off to the input of the same preamplifier, as may be required, so that a complete region surrounding the transmitter may be watched by these sound pick up devices. When several preamplifiers are used, their electrical outputs, such as the one shown at 37 for the preamplifier 29 may be connected in parallel to one or several contacts such as 27, the circuit and control arrangement of which will be hereinafter described.

The high frequency part of the transmitter is indicated at 16 with the aerial 26 and its structure does not need any further description as being conventional per se. However and for the purposes of description of the invention, an amplifier 28 of low frequency range has been separately shown for the modulation and keying control of the continuous wave formed in the said high frequency part of the transmitter.

The automatic keying device is quite similar to that shown in FIG. 1 but for the omission of the cam 14 and elements associated thereto and for the substitution of the manually operated switch 21 by a work contact 34 of a relay 33 fed by the output of the final stage 32 of the preamplifier 29. It may further be arranged, in such an automatically activated transmitter as the one illustrated in FIG. 2, to control the efficiency of the high frequency part 16 by the said contact 34. For this reason a branch 39 has been shown from the supply lead of the heaters of the triodes 17—18 towards the part 16 of the transmitter for controlling the application of the heating current to part at least of the vacuum tubes included in that portion of the transmitter.

The cam 10, when rotating, actuates at the rhythm of a code provided upon part at least of the periphery thereof, a change-over contact 27 which switches the input of the amplifier 28 from the output of the amplifier to the output lead of any preamplifier 29 as provided in the equipment, and vice-versa. Each time the change-over contact 27 is in the upper position thereof (with respect to the drawing), the loop around the amplifier makes it oscillate at a low frequency which will modulate the continuous wave from the transmitter and this frequency is a fixed one. When on the other hand, the change-over contact 27 is on the lower position thereof, the amplifier 28 is not looped back but receives the signal from the stage 31 of the preamplifier 29 so that the transmitter will be amplitude modulated by the noise collected by 30 and converted into an electrical current through 30 and 31.

The device will operate only when the noise picked up by the microphone 30 reaches and exceeds a predetermined threshold as defined by the response of the final stage of the preamplifier 29 for the actuation of the relay 33 which, otherwise, remains at rest and at the contact 34 of which the heaters of the vacuum tubes in the equipment, and specially of 17—18, do not receive any supply from the battery 1. When this threshold is reached, the relay is operated, the said contact 34 closes and the automatic keying device operates as herein described.

It is desirable that the said relay 33 cannot be operated by noise transients and the winding of relay 33 is shunted by a condenser 35 which gives to the actuation circuit a suitable time constant. It may be considered as of advantage to provide separate time constants for activation and de-activation and in such a case, the relay 33 might be provided with an additional contact introducing a further additional condenser in shunt across the winding thereof when actuated.

At 36 is shown the adjustable potentiometer which provides for the determination of the operative threshold of the relay 33 as required for the activation of the automatic keying and signalling equipment of the transmitter.

What is claimed is:

1. A lightweight independent battery supplied keyed high frequency transmitter comprising the combination of at least one high frequency crystal-controlled oscillator, at least one code identification cam for the keying thereof, a low-frequency vacuum tube oscillator comprising an oscillating plate circuit including an inductance coil providing the sole inductive reactance for determining the frequency of the oscillator, a small asynchronous motor of light weight having a squirrel-cage rotor, the stator of which is constituted by the said inductance coil, a shaft driving the cam from said rotor and means for selectively controlling the heater of the vacuum tube in the said low frequency vacuum tube oscillator for the activation and de-activation thereof to control the high-frequency oscillator.

2. A lightweight independent battery supplied keyed transmitter according to claim 1 comprising a further cam driven by the said shaft and having electrical contacts serially connected with the electrical keying contacts of the said code identification cam for periodically interrupting the transmission of the said identification code.

3. A lightweight independent battery supplied keyed transmitter according to claim 1 in which the high frequency crystal-controlled oscillator is keyed by said cam and including pick-up means for deriving a signal from an external phenomenon, a modulating stage connected to the input of the crystal-controlled oscillator, and means including contacts controlled by the cam between the keying intervals for connecting the pick-up means to the input of the modulating stage whereby an amplitude-modulated signal in accordance with said phenomenon may be transmitted.

4. A transmitter in accordance with claim 3 in which the contacts are those of a change-over contact, said change-over contact being switched by the cam to alternately key the modulating stage for transmitting a code signal and to connect the pick-up means to the input of the modulating stage to provide an amplitude-modulated signal.

5. A transmitter in accordance with claim 4 in which the modulating stage comprises a low frequency amplifier, said change-over contacts operating when switched to key the modulating stage to open and close a regenerative feed-back loop in the amplifier in accordance with the coded signal to produce keyed low-frequency oscillations.

6. A lightweight independent battery supplied keyed transmitter according to claim 3, wherein the external phenomenon is the ambient sound level of a microphone serving as the means for deriving a signal from said phenomenon.

7. A transmitter according to claim 3 and wherein a preamplifier is inserted between the means for deriving a signal from the external phenomenon and the cam-controlled contacts through which will pass the electrical signal issuing therefrom for the modulation of the said transmitter.

8. A transmitter according to claim 3 wherein said means for selectively controlling the heater of the vacuum tube also controls the application of heating current to the vacuum tubes of the modulating stage to control the activation thereof.

9. A transmitter according to claim 8 wherein said means for selectively controlling the heater of the vacuum tube also controls the application of heating current to part at least of the high frequency portion of the transmitter.

10. A transmitter according to claim 8 including a manually responsive switch for operating the heater control means.

11. A transmitter according to claim 8 including a threshold device energized by the output of said pick-up means, and means for automatically operating the heater control means in response to energization of the threshold device.

12. A transmitter according to claim 11 in which said threshold device comprises a relay, and a preamplifier for energizing the threshold device in response to output signals from said pick-up means.

13. A lightweight independent battery supplied keyed transmitter according to claim 12, wherein the said threshold device is a relay which is slow acting, at least for the actuation thereof.

14. A transmitter according to claim 3, and including a threshold device controlled by said pick-up means and operating to activate said modulating stage when the amplitude of said external phenomenon exceeds a certain value.

References Cited in the file of this patent

UNITED STATES PATENTS

| | | |
|---|---|---|
| 1,563,084 | Harris | Nov. 24, 1925 |
| 2,134,562 | Kimmich | Oct. 25, 1938 |
| 2,422,337 | Chilowsky | June 17, 1947 |
| 2,425,297 | Atkins | Aug. 12, 1947 |
| 2,448,787 | Ferrel | Sept. 7, 1948 |
| 2,459,281 | McDonald | Jan. 18, 1949 |
| 2,785,223 | Hackenberg et al. | Mar. 12, 1957 |

FOREIGN PATENTS

| | | |
|---|---|---|
| 550,430 | Great Britain | Jan. 7, 1943 |